United States Patent
Seelig et al.

(10) Patent No.: US 12,229,674 B2
(45) Date of Patent: Feb. 18, 2025

(54) METHOD AND ILLUMINATION APPARATUS OF THE ADAPTIVE OPTICS IN REFLECTION MICROSCOPY

(71) Applicant: MAX-PLANCK-GESELLSCHAFT ZUR FOERDERUNG DER WISSENSCHAFTEN E.V., Munich (DE)

(72) Inventors: Johannes Dominik Seelig, Bonn (DE); Ivan Vishniakou, Bonn (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 96 days.

(21) Appl. No.: 17/917,254

(22) PCT Filed: Apr. 1, 2021

(86) PCT No.: PCT/EP2021/058599
§ 371 (c)(1),
(2) Date: Oct. 6, 2022

(87) PCT Pub. No.: WO2021/204663
PCT Pub. Date: Oct. 14, 2021

(65) Prior Publication Data
US 2023/0098493 A1    Mar. 30, 2023

(30) Foreign Application Priority Data
Apr. 7, 2020   (DE) ............... 10 2020 109 734.4

(51) Int. Cl.
G06N 3/08      (2023.01)
G01N 21/64     (2006.01)
(Continued)

(52) U.S. Cl.
CPC .......... *G06N 3/08* (2013.01); *G01N 21/6458* (2013.01); *G02B 21/0072* (2013.01); *G02B 21/0076* (2013.01); *G02B 21/367* (2013.01)

(58) Field of Classification Search
None
See application file for complete search history.

(56) References Cited

U.S. PATENT DOCUMENTS

| 2016/0003740 A1 | 1/2016 | Tao et al. |
| 2016/0209646 A1 | 7/2016 | Hattori et al. |

(Continued)

FOREIGN PATENT DOCUMENTS

| DE | 102018108628 A1 * | 10/2019 |
| EP | 3 048 465 A1 | 7/2016 |

(Continued)

OTHER PUBLICATIONS

T. J. Gould et al.: "Adaptive optics enables 3D STED microscopy in aberrating specimens", Optics Express, vol. 20, No. 19, pp. 285-314 (2012).

(Continued)

*Primary Examiner* — James M Anderson, II
(74) *Attorney, Agent, or Firm* — Norman B. Thot

(57) ABSTRACT

A method for training a mathematical model which describes a light propagation in a reflection microscopy includes radiating a light distribution $I_0$ into an excitation path of a microscope, modulating the light distribution $I_0$ to form a light distribution $I_A$ in the excitation path via an optical modulator, reflecting the light distribution $I_A$ at a location of a sample in a detection path of the microscope, modulating the light distribution $I_A$ to form a light distribution $I_D$ in the detection path via a further optical modulator, recording a reflected light distribution $I_D$, repeating the above steps n-fold to generate an n-fold 3-tuple ($M_A$, $M_D$;

(Continued)

$I_D$), transferring the n-fold 3-tuple ($M_A$, $M_D$; $I_D$) to a computer to implement a mathematical model F for a light propagation in reflection microscopy, and ascertaining the mathematical model F which describes the light propagation in reflection microscopy based on the n-fold 3-tuple ($M_A$, $M_D$; $I_D$).

16 Claims, 6 Drawing Sheets

(51) Int. Cl.
  *G02B 21/00*    (2006.01)
  *G02B 21/36*    (2006.01)

(56) References Cited

U.S. PATENT DOCUMENTS

2017/0343784 A1   11/2017   Wu et al.
2020/0264419 A1   8/2020    Diederich et al.

FOREIGN PATENT DOCUMENTS

WO   WO 2014/152739 A2   9/2014
WO   WO 2018/177680 A2   10/2018

OTHER PUBLICATIONS

D. Débarre et al.: "Image-based adaptive optics for two-photon microscopy", Optics Letters, Optical Society of America, vol. 34, No. 16, pp. 2495-2497 (2009).

S. W. Paine et al.: "Machine learning for avoiding stagnation in image-based wavefront sensing", Spie Proceedings, vol. 10980, pp. 109800T-1-109800T-8 (2019).

S. W. Paine et al.: "Machine learning for improved image-based wavefront sensing", Optics Letters, vol. 43, No. 6, pp. 1235-1238 (2018).

* cited by examiner

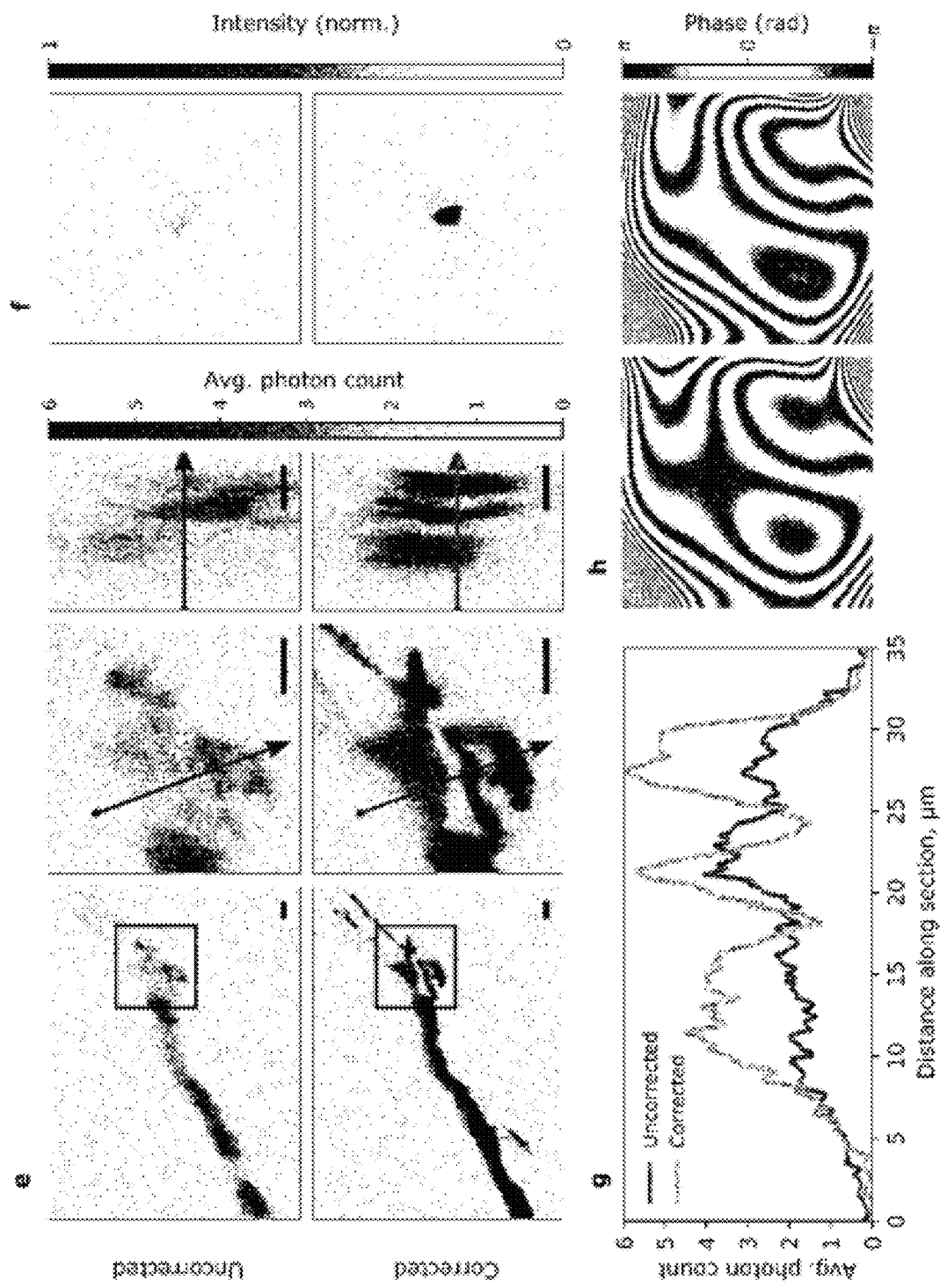
Fig. 3 (Continuation)

METHOD AND ILLUMINATION APPARATUS OF THE ADAPTIVE OPTICS IN REFLECTION MICROSCOPY

CROSS REFERENCE TO PRIOR APPLICATIONS

This application is a U.S. National Phase application under 35 U.S.C. § 371 of International Application No. PCT/EP2021/058599, filed on Apr. 1, 2021 and which claims benefit to German Patent Application No. 10 2020 109 734.4, filed on Apr. 7, 2020. The International Application was published in German on Oct. 14, 2021 as WO 2021/204663 A1 under PCT Article 21(2).

FIELD

The present invention relates to the technical area of adaptive microscopy and in particular adaptive reflection microscopy.

BACKGROUND

In optical microscopy, in particular in optical microscopy of biological samples, the imaging is limited by aberrations and scattering. In this context, it has been shown that the optical resolution can be improved if, for example, the method of laser scanning microscopy is combined with methods of adaptive optics. This enables aberrations to be reduced by means of suitable wavefront forming.

To examine a sample having such restricted transparency (i.e., subjected to aberrations and light scattering), irradiation light can be analyzed after it has passed through the sample or when it is reflected by the sample. Imaging using reflected light appears to be more suitable in a sample having restricted light transparency, in particular if an image is to be recorded within a scattering material which has better optical accessibility from one side than from the other.

The imaging using reflected light is linked to the difficulty, however, that aberrations which arise in an excitation path (when the radiation light is guided to the sample) and aberrations which arise in a detection path (the path which the light reflected from the sample runs) are generally different and are also not easy to separate from one another.

Once again in other words: in numerous applications of (biological) microscopy, when attempts are made, using a light microscope, to look into tissue or other materials which are only partially transparent, irradiation light beams are deflected and scattered, which results in a fuzzy image with little light. The irradiation light can in particular be provided by a laser which scans over the sample. The image thus generated is generally formed in that excitation light which penetrates from a microscope objective into the sample is partially there reflected back into the objective and is focused in a "sample image", which is distorted due to the scattering. The distortion of an image within a material having little transparency results in that the irradiation light which penetrates into the sample on the excitation path is deflected from its path. The light reflected from the sample behaves similarly; this light is backscattered from a plane which lies in the focus of a microscope. This focal plane (or rather focal volume) can be viewed together with the reflective structures present there (for example, tissue) as a secondary light source. The reflected light originating from the secondary light source is collected by an objective and focused in an image. The reflected light (or in other words, the secondary light source) is deflected from its undisturbed path on its path out of the sample, similar to the radiation light. The combined deflections of the radiation light and the reflection light, together with the properties of the reflective material, contribute to the overall distortion of the image.

Approaches for wavefront recognition have more recently been developed on the basis of "deep neural networks" (see S. W. Paine and J. R. Fienup, "Machine learning for improved image-based wavefront sensing," Opt. letters 43, 1235-1238 (2018)). These methods compare measured light distributions directly to those generated by computer. These approaches have heretofore only disadvantageously functioned when a single passage through a sample has to be corrected. These methods are thus in particular not suitable for microscopy or imaging using light reflected from the sample.

SUMMARY

An aspect of the present invention to provide a method and an irradiation apparatus with which distortions can be effectively reduced in the imaging in reflection microscopy.

In an embodiment, the present invention provides a method for training a mathematical model which describes a light propagation in a reflection microscopy. The method includes a step a) of radiating a light distribution $I_0$ using an illumination unit which is assigned to a microscope into an excitation path of the microscope, a step b) of modulating the light distribution $I_0$ to form a light distribution $I_A$ in the excitation path via an optical modulator, wherein the optical modulator provides a light modulation $M_A$, a step c) of reflecting the light distribution $I_A$ at a location of a sample in a detection path of the microscope, a step d) of modulating the light distribution $I_A$ to form a light distribution $I_D$ in the detection path via a further optical modulator, wherein the further optical modulator provides a light modulation $M_D$, a step e) of recording a reflected light distribution $I_D$, repeating steps a) to e) n-fold so as to generate an n-fold 3-tuple $(M_A, M_D; I_D)$, transferring the n-fold 3-tuple $(M_A, M_D; I_D)$ to a computer so as to implement a mathematical model F for a light propagation in reflection microscopy, and ascertaining the mathematical model F which describes the light propagation in reflection microscopy based on the n-fold 3-tuple $(M_A, M_D; I_D)$.

BRIEF DESCRIPTION OF THE DRAWINGS

The present invention is described in greater detail below on the basis of embodiments and of the drawings in which.

DETAILED DESCRIPTION

Figure 1:
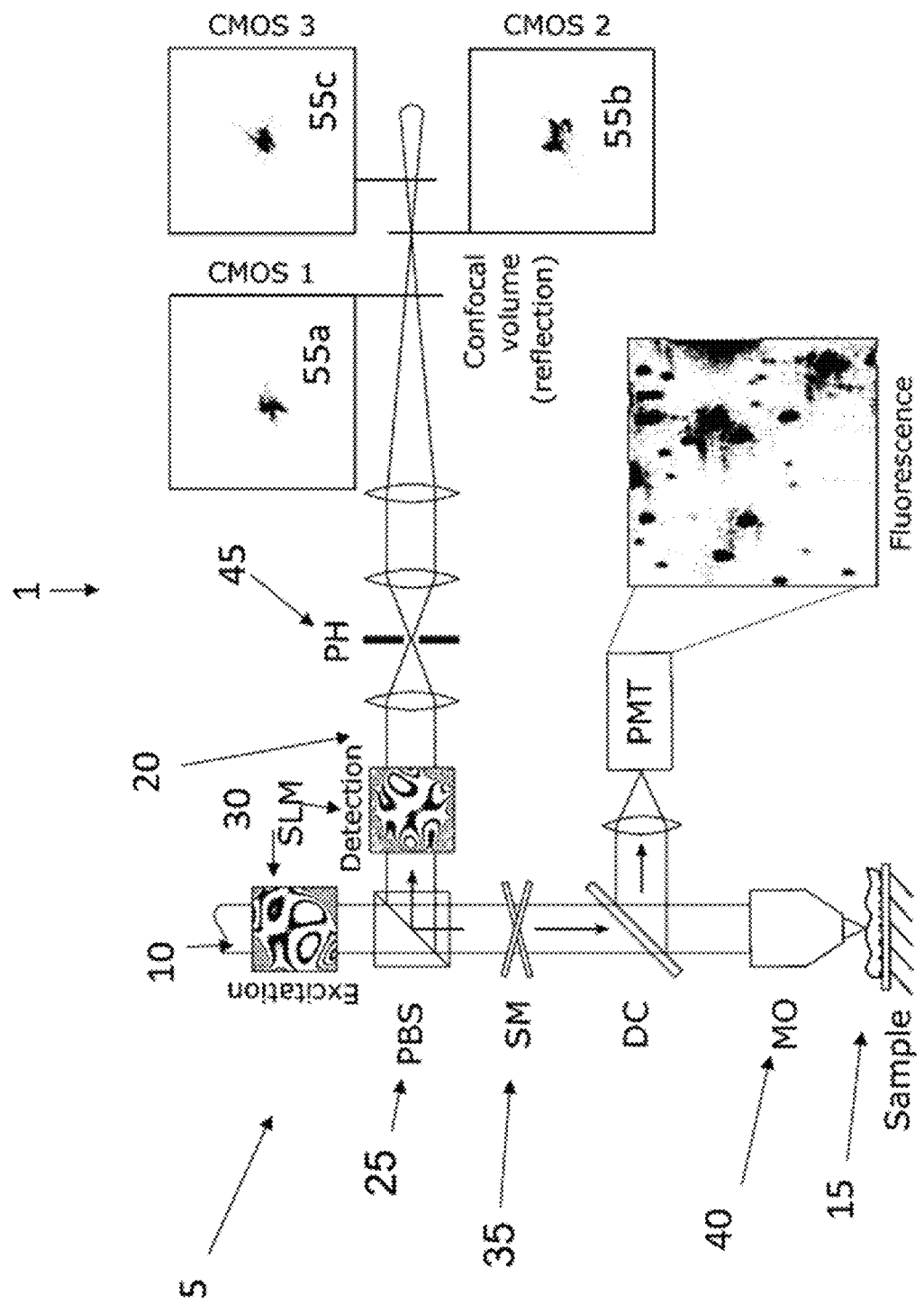
FIG. 1 shows a schematic structure of the adaptive irradiation apparatus.

According to a first aspect of the present invention, a method is provided for training a mathematical model, which describes the light propagation in reflection microscopy, in particular in laser microscopy in the scanning method, wherein the method comprises the following steps:

a) Radiating a light distribution $I_0$ (typically a laser beam having a Gaussian intensity profile which is focused in the microscope) using an illumination unit assigned to a microscope into an excitation path of the microscope. The light path which leads to a sample of the microscope is hereinafter referred to as the excitation path, since the sample, when it is irradiated by the light distribution $I_0$, is quasi "excited" to illuminate as a "secondary light source".

b) Modulating the light distribution $I_0$ to form a light distribution $I_A$ in the excitation path via an optical modulator, wherein the optical modulator causes the light modulation $M_A$. The light modulation $M_A$ by the optical modulator represents in this case a possible distortion, in particular a distortion in the phase of the light, which the light distribution $I_0$ experiences upon penetrating into the sample body. The sample is thus no longer irradiated using the actually desired light distribution $I_0$.

c) Reflecting the light distribution $I_A$, in particular at the location of the sample, in a detection path of the microscope. The detection path is in this case the beam path of the microscope which leads away from the location of the sample to a recording unit.

d) Modulating the known light distribution $I_A$ to form a light distribution $I_D$ in the detection path via a further optical modulator, wherein the optical modulator causes the light modulation $M_D$. Similarly to $M_A$, $M_D$ represents a possible distortion of the light upon exiting the sample body.

e) Recording the reflected light distribution $I_D$. The reflected light distribution $I_D$, which quasi represents a "final image" from the location of the sample, can, for example, be recorded by a camera, in particular a CCD camera or a CMOS camera.

Repeating steps a) to e) n-fold times, by which an n-fold 3-tuple ($M_A$, $M_D$; $I_D$) is generated. For this purpose, it can be necessary to repeat the steps 50,000 times, for example, 100,000 times, for example, 200,000 times (or more).

Transferring the n-fold 3-tuple ($M_A$, $M_D$; $I_D$) to a computer on which a mathematical model F for light propagation in reflection microscopy is implemented and ascertaining the mathematical model F which describes the light propagation in reflection microscopy on the basis of the n-fold 3-tuple ($M_A$, $M_D$; $I_D$). To calculate the mathematical model, a calibration measurement of the optical system can, for example, be added in addition to the 3-tuple. This calibration measurement describes distortions which occur intrinsically in the microscope optics between the excitation path and the detection path. This relationship between excitation path and detection path is also dependent on the initial light distribution $I_0$ and the precise beam alignment in the microscope. These parameters assist the mathematical model F to better modulate the light propagation. Because these parameters frequently (in contrast to the other parameters) are not, however, varied at all, but are rather constant, they can also be made known once at the beginning to the mathematical model F.

Because the modulations $M_A$ and $M_D$ are known, the correspondingly designed mathematical model F can model the light propagation in reflection microscopy if only the "final" light distribution $I_D$ is measured and transferred linked to the modulations underlying it to the mathematical model as input. If the mathematical model F is adequately trained after a sufficient repetition of the method steps, thus a sufficiently large data set, it is possible to conclude the respective modulations $M_A$ and $M_D$ of the excitation path or the detection path, respectively, solely on the basis of the knowledge of the light distribution $I_D$. The distortions of the excitation path and the detection path can thus be respectively "untangled" separately from one another. The knowledge of the distortion in the respective paths can advantageously be used to correct the distortions and obtain an image of the sample having a higher resolution. This can be achieved in that the complexly conjugate distortions are used on the modulator in the excitation and/or detection path to compensate for the actual distortions in the sample.

The optical modulator is expediently a spatial light modulator ("SLM"), which modulates the profile of the light beam. For many applications, controlling the phase and intensity of the light beam is of great importance. The SLM can, for example, be based on liquid crystals, which is in particular used for phase modulation. In this case, it is expedient to use phase patterns for training the neural network. Alternatively thereto, the spatial light modulator can be a digital mirror for generating a binary intensity pattern. Known high-speed digital micromirror devices (DMD) can generate binary patterns of high and low values (ones and zeros) at an image frequency of 22.7 kHz. Thus, for example, if a continuous wave laser is used which radiates continuously on the digital mirror, an n-tuple ($I_{Ei}$, $I_{Ai}$) can be generated at this frequency. This DMD can also be used to generate phase patterns. It is in principle possible to vary multiple light parameters (intensity, phase, and polarization) simultaneously using a combination of multiple optical modulators or using one modulator, to obtain the best possible control over the light distribution. The method thereby becomes even more flexible and accurate.

The mathematical model F can, for example, be formed by a neural network.

In particular for complex systems, which possibly even elude a functional description in the narrower meaning, neural networks are particularly suitable for modeling the behavior of these systems. In the scope of the present invention, the concept of mathematical model F is therefore also to be considered to be broadly formulated and is ultimately only to reflect that an output is generated by the input of input values, wherein the output value is defined by the modelled light propagation. Such a result can, for example, be generated by the neural network without this having to be based on an algebraic function as such. The neural network calculates or simulates the mathematical model F by way of the model underlying the neural network made up of artificial "neurons" and their connections. A further property of neural networks is that they model a complex system better the more data are collected for training the neural network. A neural network thus corrects in the direction of the real system with a rising number of training data sets, wherein the structure of the network is supposed to be adapted for better usage of the larger amounts of data.

In one exemplary embodiment of the present invention, the light modulations ($M_A$, $M_D$) can, for example, be changed or varied upon each repetition.

These variations can be carried out in a controlled manner, wherein it is previously defined over which parameter space having previously defined iterations steps variation is carried out or rather the variations can be implemented in a randomly-based manner. The larger the training data set, the more advantageous it is in general to carry out randomly-based variations, since practice has shown that real systems can thereby be modulated better.

These variations offer the advantage that due to a continuous change of the light modulation, a large parameter space is spanned over many possible real scattering samples, which are simulated in the microscope. If the light modulations ($M_A$, $M_D$) would not be changed, ultimately only a single real system could be depicted, but no statements about other systems made. Both light modulations ($M_A$, $M_D$) can, for example, be changed, because a plurality of illumination apparatuses is thereby generally described. It is also possible to change only a single one of the light modulations $M_A$ or $M_D$. This can make sense, for example, in exceptional cases if distortions are only to be expected in a single path. One possibility is to form the light modulations ($M_A$, $M_D$) so that they correspond to so-called Zernike modes. It is known that these Zernike modes are suitable for describing weak distortions.

The variations of the light modulations ($M_A$, $M_D$) can, for example, be changed dependently or completely independently of one another upon each repetition.

If the variations of $M_A$ and $M_D$ are completely independent of one another, the light propagation in a plurality of illumination apparatuses and samples can thus thereby be described in great generality. The complete independence, to this extent, is to be understood to mean that the distortion in the excitation path $M_A$ is completely independent of the distortion of the detection path $M_D$. The disadvantage of this method is that in general significantly more repetitions must be carried out to generate a sufficiently large training data set for the mathematical model F.

In reality, the assumption is at least valid (depending on the strength of the aberrations in the sample) that the distortion in the excitation path $M_A$ is not completely independent of the distortion of the detection path $M_D$. This is already true solely because the light beam goes at least partially on the same path out of the sample as it has also gone therein. For example, a maximum variation between the detection path $M_D$ and the excitation path $M_A$ of +/−30% is selected. This offers the advantage that many real systems can thereby be described sufficiently well and at the same time a significantly smaller training data set is required than in the case of the complete independence of the variation of $M_D$ and $M_A$.

In one exemplary embodiment, the light distribution $I_A$ at the location of the sample is reflected using a mirror. This offers the advantage that the light distribution is reflected using inexpensive means and is unaltered to the greatest extent possible. When generating the training set, if possible, the individual distortions are to be induced by the optical modulators.

Instead of using a mirror, the generation of the data set can also be generated using another scattering or reflective material, for example, using tissue.

Alternatively to the experimental generation of the data set, all steps of the method can also be simulated in the computer. In this case, the data sets would only be generated by computer, and adapted to the specific microscope and sample parameters by possible calibration measurements.

This offers the advantage that a large number of repetitions can be carried out very efficiently. This enables a very large data set to be generated via which the mathematical model F is trained. A simulation of the steps in the computer is possible since light propagation in a microscope can be modulated very accurately in the scope of wave optics or Fourier optics.

According to a second aspect of the present invention, a method is provided for correcting a reflection image in microscopy, in particular in laser microscopy in the scanning method. All features, if not expressly excluded, which were made above in conjunction with the method for training a mathematical model which describes the light propagation in reflection microscopy, also apply in the method to be described below.

For this purpose, the method comprises the following steps:

a) Radiating a light distribution $I_0$ using an illumination unit assigned to a microscope, in particular a laser, into an excitation path of the microscope; wherein the excitation path guides the light distribution $I_0$ to a sample and the light distribution $I_0$ is distorted upon entering the sample, in particular by scattering effects, to form a light distribution $I_{A, sample}$.

b) Reflecting the light distribution $I_{A, sample}$ at the sample in a detection path of the microscope, wherein the $I_{A, sample}$ is distorted upon exiting the sample to form the light distribution $I_{D, sample}$.

c) Recording the reflected light distribution $I_{D, sample}$.

d) Transferring the reflected light distribution $I_{D, sample}$ to a mathematical model F, in particular to a mathematical model F, which describes the light propagation in reflection microscopy. The initial light distribution $I_0$ and a relationship $B_0$ between the excitation path and detection path can, for example, also be transferred as further parameters to the mathematical model F, which help so that the mathematical model F can calculate the light propagation on the basis of the largest possible number of parameters that describe the starting conditions. Since $I_0$ and $B_0$ are, however, often not varied at all (in contrast to the other parameters), but are rather constant, they can also be made known once to the mathematical model F at the beginning.

e) Outputting a 2-tuple ($M_A$, $M_D$), wherein $M_A$ describes the distortion of the light distribution $I_0$ upon entering the sample and wherein $M_D$ describes the distortion of the light distribution $I_{A, sample}$ upon exiting from the sample.

f) Setting a complementary distortion pattern $M_A^\#$ (based on the complexly conjugate pattern for $M_A$) on an optical modulator of the excitation path and/or a complementary distortion pattern $M_D^\#$ (based on the complexly conjugate pattern for $M_D$) on a further optical modulator of the detection path. A further possibility is setting a complementary distortion pattern based on an arbitrary combination of the above-mentioned distortion patterns (for example, a complementary distortion pattern based on $M_A^\#$ both in the excitation path and in the detection path).

In that at least the reflected light distribution $I_{D, sample}$ is transmitted to the mathematical model F, the mathematical model F can ascertain which distortions the light distribution $I_0$ was subjected to in the excitation path and independently thereof in the detection path, so that the "final" reflected light distribution $I_{D, sample}$ results, which is recorded using a camera, in particular a CMOS camera. Upon the measurement of the distorted reflected light distribution $I_{D, sample}$, the optical modulators can already be attached in the excitation path and also in the detection path. If the optical modulators are set to "neutral", they negligibly influence the distortion of the light beam. The light is then reflected more or less as on a mirror. In this context, it is moreover advantageous to generate the light distribution $I_0$ by way of a laser. The advantages of a laser are that its beam properties can be adjusted very accurately so that the light distribution $I_0$ can be considered to be known and constant. Moreover, scanning a sample is in practice best possible using a laser, since a laser enables a collimated light beam to be sent at constant diameter through a microscope.

The 2-tuple ($M_A$, $M_D$), which is output by the mathematical model F, describes which distortions the light was subjected to in the excitation path and in the detection path. If the optical modulator of the excitation path is now set to the distortion pattern $M_A^{\#}$ complementary to $M_A$, the distortion $M_A$ is thus corrected beforehand, so that the light distribution $I_0$ is approximately incident on the sample. Upon exiting from the sample, the light distribution $I_0$ is again distorted by scattering effects in accordance with the factor $M_D$, which is in turn compensated for in that the optical modulator located in the detection path is set to $M_D^{\#}$. The optical modulator of the excitation path is thus arranged in the beam direction before the entry into the sample and the optical modulator of the detection path is arranged in the beam direction after the exit from the sample. This method enables the distortions induced by the sample to be substantially corrected and the image of the sample to be able to be detected at a high resolution.

An image can be generated either using reflected light (reflection microscopy), wherein advantageously distortions are corrected in the excitation path and in the detection path. In reflection microscopy, an image is typically generated using a detector (photomultiplier tube (PMT) or avalanche photodiode (APD)) in a confocal detection scheme by a pinhole aperture together with the scanning of the sample by the focused laser beam. Alternatively thereto, the correction found of the excitation path can also be used for fluorescence measurements, for example, using single-photon or multiphoton excitation. It can also be sufficient in this case to use only the correction of the excitation path since the image formation is not dependent on the correction of the detection path.

It is possible in this context to use two different optical modulators or one single optical modulator, wherein, in the case of a single optical modulator, the excitation path and the detection path are incident on separate spatial regions of the optical modulator, which can be individually actuated.

According to a further aspect of the present invention, an irradiation apparatus is provided which is suitable for carrying out the above-described method. The irradiation apparatus includes:

a microscope comprising,
an illumination unit, in particular a laser, designed to generate a light distribution $I_0$,
an excitation path having an optical modulator provided in the excitation path, wherein the excitation path guides the light distribution $I_0$ to the location of a sample;
a detection path having an optical modulator provided in the detection path, wherein the detection path passes on the light reflected at the location of the sample;
a camera, which records the reflected light of the detection path;
a computer unit, wherein the computer unit is assigned to the microscope.

Using this illumination apparatus, a distorted image of a sample can be effectively corrected in reflection microscopy, so that an image can be recorded at a higher resolution by the microscope.

The computer unit can, for example, be designed to create a mathematical model F to describe light propagation in reflection microscopy.

The computer unit can, for example, be designed to ascertain a 2-tuple correcting distortion pattern ($M_A^{\#}$, $M_D^{\#}$) and to upload the correcting distortion pattern $M_A^{\#}$ to the optical modulator of the excitation path and to upload the correcting distortion pattern matching with the situation on the further optical modulator of the detection path.

This computer unit can be connected to the illumination apparatus so that the data of the illumination apparatus can be effectively transmitted to the computer unit on which the mathematical model F is implemented. The computer unit is also designed to control the optical modulators in accordance with the outputs that the mathematical model F provides so that the distortion of the image is corrected. This offers the possibility that the resolution of the image of the sample can thus be improved in a fully automated manner.

Numerous features of the present invention are explained in greater detail below. The present disclosure is not restricted here to the specifically mentioned combinations of features. The features mentioned here may rather be combined arbitrarily to form embodiments according to the present invention to the extent not expressly excluded below.

The structure which is illustrated schematically in FIG. 1 and in detail in FIG. 5 will first be described.

Figure 5:
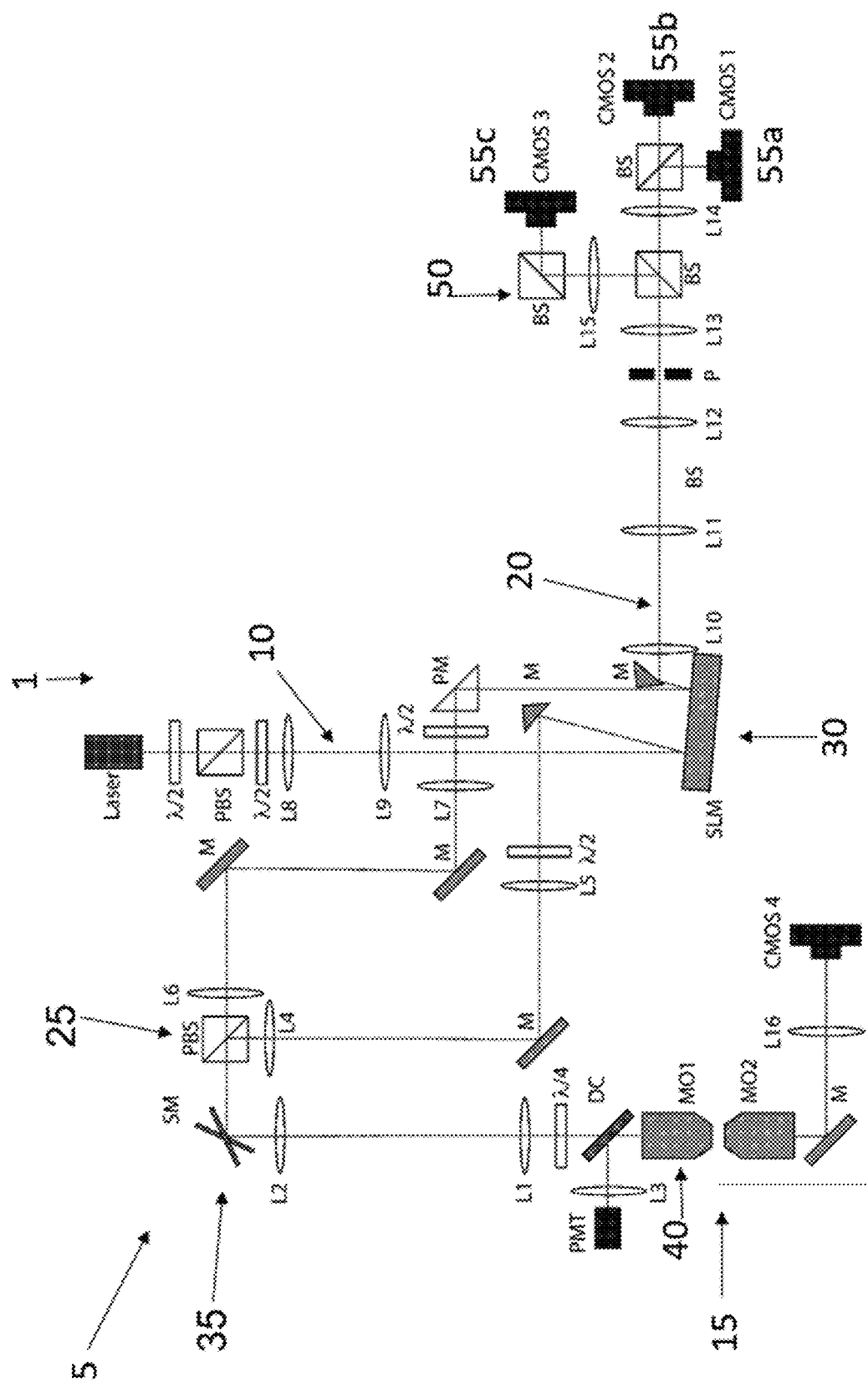
FIG. 5 shows the schematic structure of FIG. 1 with further details.

FIGS. 1 and 5 show an adaptive irradiation apparatus 1 for ascertaining and correcting image distortions both in an excitation path and in a reflection path. Before a description of the structure of FIGS. 1 and 5 is provided, the components from FIG. 5 will first be listed.

FIG. 5 shows in detail: MO1=Nikon 16×, N.A. 0.8, water immersion objective (CFI75 LWD 16× W); MO2=Olympus 40×, N.A. 0.8, LUMPLFLN; all lenses were from Thorlabs, achromatic doublets, antireflective coating for 650 to 1050 nm. The focal lengths (in mm) L1=300, L2=30, L3=50, L4=125, L5=300, L6=100, L7=400, L8=75, L9=250, L10=150, L11=150, L12=40, L13=50, L14=75, L15=75, L16=300. PBS=polarization beam splitter; BS=beam splitter, (both antireflective coating for 650 nm to 1050 nm); λ/2=polymer zero-order half-wave plate (WPH05ME-980), PM=reflective prism mirror; P=pinhole aperture having 300 μm diameter, CMOS=CMOS cameras (Basler, acA640-750 um); SLM=spatial light modulator (Meadowlark, HSP1920-1064-HSPS), M=mirror, DC=dichroic mirror, SM=scanning mirror; PMT=photomultiplier tubes for fluorescence detection (two-photon imaging). The CMOS 4 was only used for observation of the resulting corrections for a stationary excitation beam and was not used for calculating corrections.

The adaptive irradiation apparatus 1 comprises a microscope 5, in particular a two-photon microscope, which is equipped with a resonance scanner and is controlled via the program "ScanImage". The irradiation device 1 has an excitation path 10, which guides the light provided for irradiating an object 15 or a sample 15, the irradiation light, to the object 15 or the sample 15. In FIG. 5, a microscope objective, which conducts the image into a camera, is arranged at the location of the sample 15. The irradiation light is reflected from the sample 15 and guided via a detection path 20. The excitation path 10 and the detection path 20 can, but do not have to, entirely or partially overlap spatially. As shown in FIGS. 1 and 5, the excitation path 10 and the detection path 20 extend spatially separated after the reflected light passes through a polarization beam splitter (PBS) 25.

Both the irradiation light of the excitation path 10 and the reflected light of the detection path 20 can be modulated independently of one another using a spatial light modulator (SLM) 30, in that both paths are radiated onto different spatial regions of the SLM 30.

The irradiation light, also referred to as the excitation beam, is magnified, reflected from the SLM 30, guided in reduced size through the polarization beam splitter 25, and directed onto a scanning mirror 35. The scanning mirror 35 is provided to deflect the excitation beam, which can, for example, be a laser beam, so that the excitation beam or the laser beam "scans" over various points of the sample 15. The polarization direction is set for a maximum transmission through the PBS 25 using a λ/2 plate. The scanning mirror 35 is imaged on the rear focal plane of a microscope objective 40 (MO in FIG. 1, MO1 in FIG. 5). A quarter-wave plate is placed after the tube lens to achieve circular polarization and to optimize the reflected light as it passes through the PBS 25.

The reflected light is directed onto a different spatial region of the SLM 30 than the excitation beam and can thus be independently modulated. In the beam direction after the SLM 30, the reflected light traverses a pinhole aperture 45. After the pinhole aperture 45, the reflected light is imaged by means of three 50/50 beam splitters 50 on three different cameras 55a, b, c, wherein each of the cameras is arranged in a different focal plane. One of the cameras 55a, b, c is arranged one in front of the focal plane, one in the focal plane, and one behind the focal plane.

For the independent modulation of the excitation path 10 and the detection path 20, the SLM 30 was divided into two spatial separate regions (see FIG. 5). The two spatially separate regions each have a size of 960×1080 pixels. The SLM 30 was actuated by customer-specific software, which was written in Python using the Blink SDK provided by Meadowlark Optics. For precise centering of the phase modulations on the SLM 30, a center-symmetrical phase pattern was displayed on both parts of the SLM 30. The central pixel of the respective SLM window was found by shifting the pattern until the reflected focus was center symmetrical. The polarization direction of the beam imaged on the SLM 30 was optimized for modulation using λ/2 plates both in the excitation path 10 and in the detection path 20.

Details of the neural network which is trained using the data of the experiments are described below. In principle, however, it is also possible to use other designs of neural networks.

The convolutional neural network (CNN) architecture consists of a cascade of 4 convolutional layers having so-called ReLu activations (64 filters 11×11 having stride 4×4 and batch normalization, 64 filters 5×5 having stride 2×2 and batch normalization, 128 filters 3×3 having 2×2 max pooling, and 192 filters 3×3 having 2×2 max pooling). These layers are followed by a dense layer having 3072 elements, sigmoid activation, and 0.3-dropout regulation, as well as an output-dense layer having linear activation, the size of which corresponds to the number of the predicted Zernike modes. The network was trained by minimizing the mean absolute error (MAE) of the prediction using the Adam optimizer at a learning rate of 0.0001.

The confocal volume 55a-c (in FIG. 1), imaged in 3 planes, was normalized by division by 255 to bring 8 bpp images into the range 0 . . . 1 and was stacked in a tensor 192×192×3, which is used as the input for the neural network.

The output was the corresponding phase modulation, shown as the vector of Zernike coefficients (Z1 . . . Z28), in cases in which both modulations of the excitation light and also of the reflected light were used, both were linked as a single vector ($Z1_{exc}$ . . . $Z28_{exc}$, $Z1_{det}$ . . . $Z28_{det}$). Each random modulation was generated by mixing a harmonic sequence 1.5 π/n and randomly selecting the sign of each of its elements. The mode Z1 (piston) is set to 0 both for the excitation and for the detection/reflection.

Returning to FIG. 1: The two-photon microscope 5 is combined with spatial light modulators 30 (SLM) and a reflection detection for wavefront detection and wavefront correction. The focal spot reflected by the sample 15 is monitored in three different focal planes using the cameras 55a-c. Excitation path 10 and detection path 20, also referred to as reflection path 20 (because the detection path guides the light reflected by the sample 15 to the cameras), are spatially separated and therefore can be modulated independently of one another using the SLMs 30. For this purpose, it is possible to provide one SLM 30 for the excitation path 10 and another SLM 30 for the detection path 20 or else, as shown in FIG. 5, to provide various spatial regions of a single SLM 30 for the respective paths.

The motivation to spatially separate the excitation path 10 and the detection path 20 from one another is that distortions in the two paths can differ from one another, so that it becomes necessary to model both the excitation path 10 and also the detection path 20 separately, so that distortions can be corrected and a clear image of the sample 15 results in the microscope.

In general, the light of the excitation path experiences distortions, which changes the PSF in the focal plane, at least at the location of the sample 15. The light reflected by the sample 15 then quasi acts as a "secondary light source" with respect to the detection path 20, which is also distorted again. Different aberrations for the two paths thus result.

Figure 2:
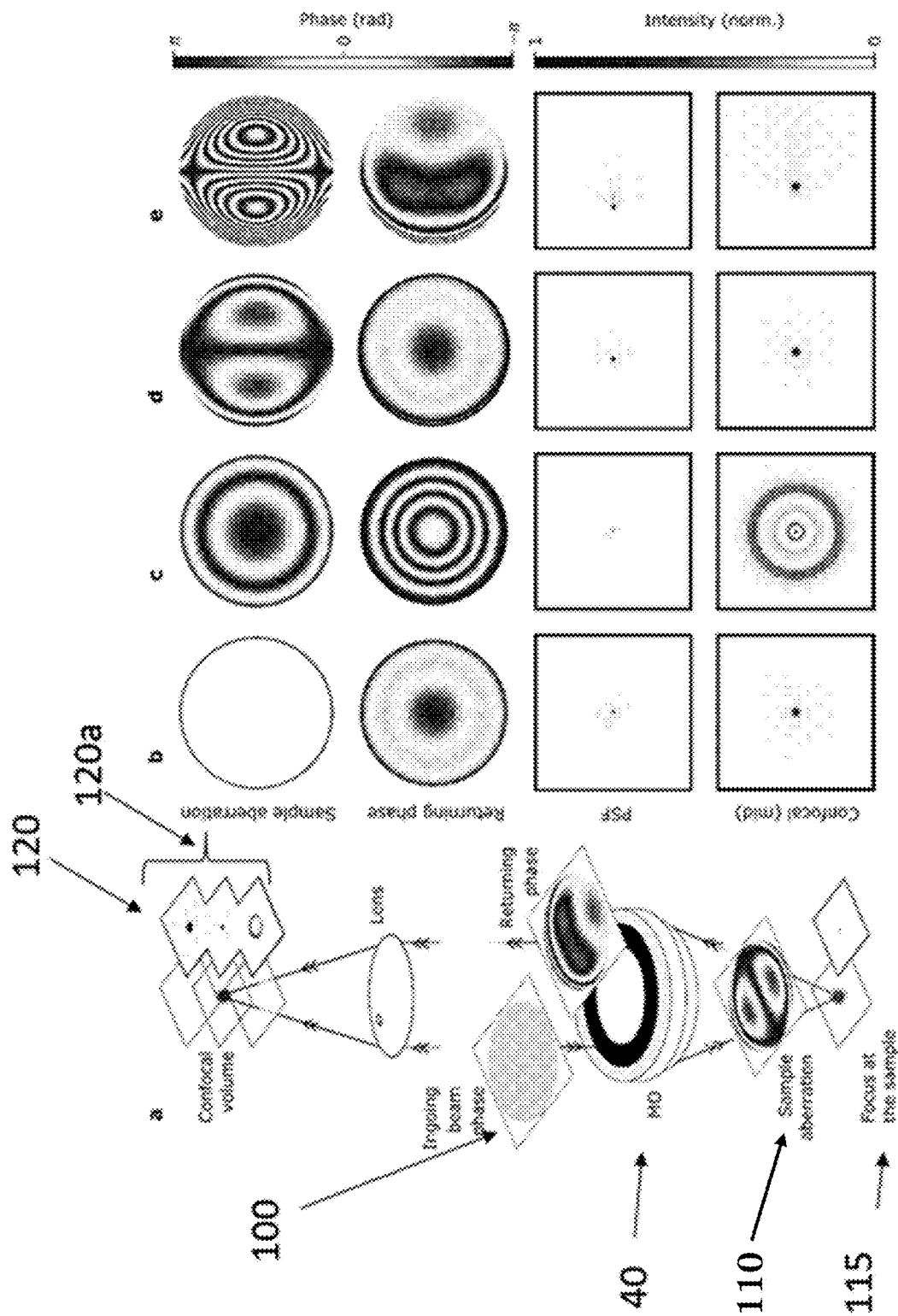
FIG. 2 shows a simulation of the influence of various distortions on a reflected focus.

This is illustrated by a simulation according to FIG. 2:

Using a "Rayleigh-Sommerfeld solver [L. M. Sanchez Brea, "Diffractio, python module for diffraction and interference optics," https://pypi.org/project/diffractio/(2019)]", a light propagation through the microscope 5 can be simulated, wherein the "point-spread function (PSF)" at the location of the sample and the reflected focal plane were simulated. The structure of a simulation and the results are shown in FIG. 2.

The simulated light path is shown in FIG. 2a: a flat wavefront 100 enters a microscope objective of a microscope 40 and is incident on a surface of an aberrating layer 110 (also referred to as a distortion layer 110) which causes a spatial phase modulation. The light beam reaches a mirror 115 (wherein the PSF is calculated in the mirror plane), is reflected back, passes the distortion layer 110 again, and is finally focused using a lens on the reflected focal plane 120.

FIG. 2 thus shows the simulation of the influence of various aberrations on a resulting reflected focus volume 120a.

FIG. 2a: arrangement of the simulated optical system. A flat wavefront enters the microscope objective and experiences a sample-induced phase modulation at a distance of 0.5 mm with respect to the mirror 115 both on the excitation path and on the reflected return path; the reflected beam is focused using a 200-mm objective. The PSF at the location of the mirror 115 and the reflected focal planes 120 are simulated.

FIG. 2b shows a simulation example without aberrations. Top row: flat wavefront, second row: reflected wavefront, third row: focus on the mirror 115, bottom row: focus on the reflected focal plane 120.

FIG. 2c shows a simulation example having aberrations of even radial order which enlarge themselves on the return path. This is an example of weak aberrations which are formed by radial-linear Zernike modes. The combined distortions which have accumulated in the excitation and detection paths double, which results in the interference pattern in the focus volume in the lower line.

FIG. 2d shows a simulation example of self-correcting aberrations of odd radial order Zernike modes. The distortions mutually cancel out.

FIG. 2e shows a simulation example as in FIG. 2d but with stronger aberrations of odd radial Zernike modes. This results in different distortions in the excitation path 10 and in the detection path 20.

It has been shown that the self-correction fails in this situation and a distorted image results in the reflected focal plane 120.

The goal was to train the neural network so that the distortions of the excitation path 10 and the detection path 20 can be ascertained independently of one another to then be able to correct the image of a sample accordingly. In other words: the excitation path 10 and the detection path 20 are to be "untangled".

For this purpose, two scenarios are tested, which each result in two different neural networks.

Scenario 1: the phase modulations of the excitation path 10 and the detection path 20 are completely independent of one another. This results in the trained "network 1".

The data set for the scenario 1 was generated in that via the SLM 30, both in the excitation path 10 and in the detection path 20, independent distortions were generated simultaneously in the form of random Zernike modes up to an order of 28. The modulation of the light beam in the excitation path 10 by the SLM 30 provided in the excitation path 10 represents the distortion which would be caused by the "penetration" of the light beam into the sample 15. The modulation of the light beam in the detection path 20 by the SLM 30 provided in the detection path 20 represents the distortion of the reflected light beam originating from the sample 15.

A mirror is attached in scenario 1 at the location of the sample 15 instead of the sample and the light reflected by the mirror is recorded by the cameras 55a—c. For the irradiation, laser light is used in a "scanning mode". Scenario 1 models a planar sample having fully uncorrelated excitation and detection aberrations.

Using the set-up of scenario 1, 180,000 pairs of different excitation and detection phases, thus 180,000 times, the SLMs 30 of the excitation path 10 and the detection path 20 were set differently, generated, and measured in experiments. However, it is also possible in principle to simulate these measurements both in scenario 1 and in scenario 2 and to train the neural network using the simulated results. This is possible because in particular beam paths in wave optics or Fourier optics can be simulated very accurately using current computer simulations. It can prove to be advantageous in this case that the simulations can be carried out automatically much faster than measurements and that material flaws/soiling do not corrupt results. This can be important above all if the trained neural network is to be used on an illumination apparatus for correcting the distortions at which the experiments for training the data were not carried out. However, if the correction is also to be carried out on the illumination apparatus on which the measurements can also be carried out, it can prove to be advantageous to actually in fact measure the measurement pairs in experiments, since in this way possible peculiarities of the illumination apparatus can be depicted, which are not detected in the simulations, for example, soiling of lenses or material flaws, etc. The simulations could also be adjusted to measurements by parameters.

Figure 4:
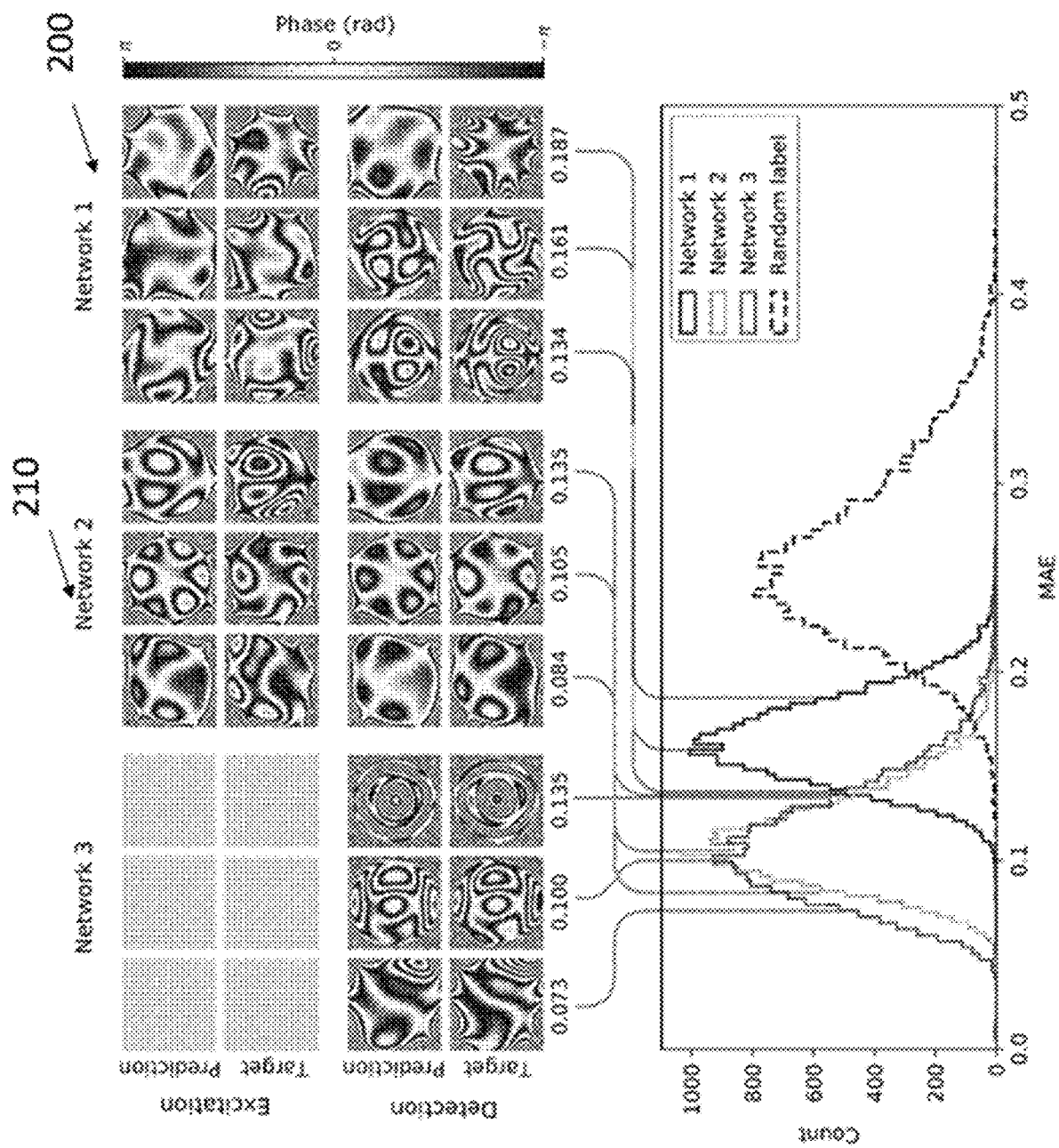
FIG. 4 shows examples of predicted and measured light distribution.

FIG. 4 shows on the right the predicted and also the measured phase modulations of the irradiation light both in the excitation path 10 and in the detection path 20. A histogram 205 of the mean absolute error is shown at the bottom in FIG. 4. The histogram 205 shows the mean absolute error between prediction and target modulation. These results show that the trained neural network 1 200 can reliably untangle the excitation path 10 and the detection path 22 and predicts independent excitation and detection phase patterns on the basis of reflected confocal images which result from the combined modulation. FIG. 4 also shows this for two further networks, namely network 2 210 and network 3. In the further course, however, only the network 2 210 is extensively explained, since it describes the essential concepts which also occur in network 1 and 3.

In really occurring systems, however, it can only be the case with very strong scattering that the phase modulation of the excitation path 10 and of the detection path 20 are completely independent of one another, as modeled in scenario 1. For this reason, further studies were performed to test whether a correspondingly trained network is capable of untangling the excitation path 10 and detection path 20 for reflected images of actual scattering bodies and whether these results can be used for a later correction of the distortions. Due to the complete independence of the excitation path 10 and the detection path 20, scenario 1 forms the general case for special cases, however. One disadvantage of scenario 1, however, is that due to the generality, in principle significantly more pairs of different excitation and detection phases must be measured or simulated. The advantage, however, is that in principle any possible system can be modeled by scenario 1.

Scenario 2: the phase modulations of the excitation path 10 and the detection path 20 varied up to +/−30% with respect to the Zernike coefficients. It is assumed that this variation models weakly-scattering samples more efficiently than scenario 1. Again, 180,000 pairs of various excitation and detection phases were used. This results in the trained "network 2".

FIG. 4 shows in the middle the predicted and the measured phase modulations of the irradiation light both in the excitation path 10 and in the detection path 20 of the "network 2" 210. A histogram 205 of the mean absolute error is shown at the bottom in FIG. 4. The histogram 205 shows the mean absolute error between prediction and target modulation. These results show that the trained neural network 2 210 can reliably untangle the excitation path 10 and the detection path 22 and predicts independent excitation and detection phase patterns on the basis of reflected images which result from the combined modulation. The focal plane of the reflected images can be better determined, for example, by a confocal pinhole aperture.

After the network 2 was trained, experiments were carried out to test how effectively the irradiation apparatus improves a distorted sample image with the aid of the neural network in laser scanning microscopy.

In these experiments, a reflective surface at the location of the sample 15 was focused on through a layer of vacuum grease. The image was guided from the location of the sample to a camera for evaluation via a 50/50 beam splitter. This focus image thus reflected enabled monitoring of the focus at the sample. To check and test a correction of the distortion of the image of the sample 15 by the illumination apparatus, fluorescent beads were placed as the sample 15 having a known diameter of 0.1 μm on the surface of the beam splitter. Laser light was scanned for irradiation over the fluorescent beads and the light reflected from the mirror (or beam splitter) and the fluorescent beads lying thereon was recorded by the cameras 55a-c, which are each shifted in relation to one another by 2-5 micrometers in the beam direction. Due to the recording of one focus volume (by the three cameras) instead of only one focus plane (by means of a camera), more items of information can be evaluated, which can improve the correction of the sample image. These distortion images were transferred to the trained network 2. The trained network 2 uses the distortion image, untangles the excitation path 10 from the detection path 20, and outputs a distortion vector of Zernike coefficients both for the excitation path 10 and for the detection path 20, which describe the distortion of the respective path. Averaging using multiple slightly different measurements can be used to improve the correction.

To correct the distortion image, a correction vector of Zernike coefficients can be set on the SLM 30 of the excitation path 10, wherein the correction vector is based on the complexly conjugate vector of the distortion vector of the excitation path 10.

To correct the distortion image, a correction vector of Zernike coefficients is set on the SLM 30 of the detection path 20, wherein the correction vector is based on the complexly conjugate vector of the distortion vector of the detection path 20.

Other combinations of excitation and/or detection correction can also be used, for example, corrections exclusively based on the excitation correction can be used in both paths.

Figure 3:
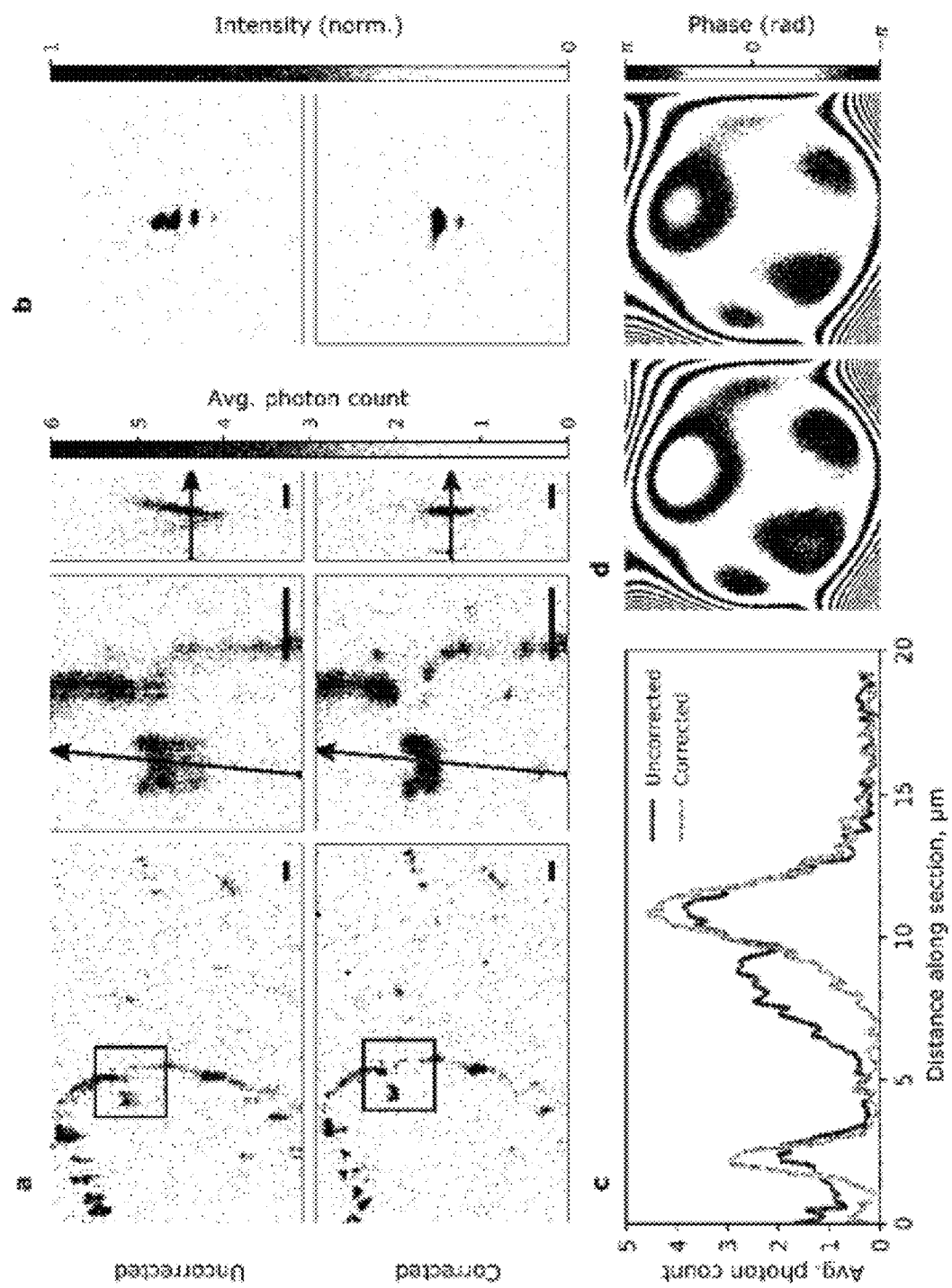
FIG. 3 shows a correction according to the present invention of the distortions of an image of the sample in reflection microscopy.

The distorted images of the sample 15 and corresponding corrections are illustrated in FIG. 3.

FIG. 3a shows that aberrations of the reflected fluorescence images ("uncorrected") can be efficiently corrected ("corrected") using the trained neural network 2. The improved focus results in an improved resolution of the sample 15 and an improved signal, as can be seen in FIG. 3c. FIGS. 3 f-h show similar results as FIGS. 3a-d, but for a different sample 15.

This method enables the analysis of reflected image recordings of samples by means of laser scanning microscopy having diffraction-limited resolution.

Distortion corrections could additionally be improved by the incorporation of higher-order Zernike modes. In the present implementation, Zernike polynomials up to the order 28 were used. Up to 120 orders were measured, for example, in a transmission configuration using a combination of deep neural networks and wavefront sensors, which indicates that higher-order modes could also be recognized in the imaging in the reflection mode.

In addition to larger data sets, various network architectures could also be used, which would profit from such larger data sets, for example, "ResNet" or "Inception". Alternatively to Zernike polynomials, (deep) neural networks can also be trained using various basic sets, which could possibly correspond better to the actual scattering properties of the sample. As an alternative to generating training data using an SLM, data sets generated completely by computer could also be used. This would enable data sets having scattered light distributions to be simulated which correspond to those observed in the samples of interest. Overall, the approach outlined here offers a versatile framework for excitation and detection aberration corrections, which is independent of the sample marking and may be integrated in laser scanning microscopy.

The present invention is not limited to embodiments described herein; reference should be had to the appended claims.

LIST OF REFERENCE NUMERALS

1 Adaptive irradiation apparatus
5 Microscope
10 Excitation path
15 Object/sample
20 Detection path
25 Polarization beam splitter (PBS)
30 Spatial light modulator (SLM)
35 Scanning mirror (SM)
40 Microscope objective (MO)
45 Pinhole aperture
50 50/50 beam splitter
55a-c Camera
100 Flat wavefront
110 Aberrating layer/distortion layer
115 Mirror
120 Reflected focal plane
120a Reflected focus volume
200 Trained neural network 1
205 Histogram
210 Trained neural network 2
BS Beam splitter
CMOS CMOS cameras
DC Dichroic mirror
λ/2 Polymer zero-order half-wave plate
M Mirror
MO Microscope objective
MO1 Nikon 16×, N.A. 0.8, water immersion objective
MO2 Olympus 40×, N.A. 0.8, LUMPLFLN
P Pinhole aperture
PBS Polarization beam splitter
PMT Photomultiplier tubes for fluorescence detection
PM Reflective prism mirror
SLM Spatial light modulator
SM Scanning mirror

The invention claimed is:

1. A method for training a mathematical model which describes a light propagation in a reflection microscopy, the method comprising:
   a step a) of radiating a light distribution $I_0$ using an illumination unit which is assigned to a microscope into an excitation path of the microscope;
   a step b) of modulating the light distribution $I_0$ to form a light distribution $I_A$ in the excitation path via an optical modulator, wherein the optical modulator provides a light modulation $M_A$;
   a step c) of reflecting the light distribution $I_A$ at a location of a sample in a detection path of the microscope;
   a step d) of modulating the light distribution $I_A$ to form a light distribution $I_D$ in the detection path via a further optical modulator, wherein the further optical modulator provides a light modulation $M_D$;
   a step e) of recording a reflected light distribution $I_D$;
   repeating steps a) to e) n-fold so as to generate an n-fold 3-tuple $(M_A, M_D; I_D)$;
   transferring the n-fold 3-tuple $(M_A, M_D; I_D)$ to a computer so as to implement a mathematical model F for a light propagation in reflection microscopy; and
   ascertaining the mathematical model F which describes the light propagation in reflection microscopy based on the n-fold 3-tuple $(M_A, M_D; I_D)$.

2. The method as recited in claim 1, wherein the mathematical model F is formed by a neural network.

3. The method as recited in claim 1, wherein the light modulation $M_A$ and the light modulation $M_D$ are changed upon each repetition.

4. The method as recited in claim 3, wherein the light modulation $M_A$ and the light modulation $M_D$ are changed dependently or fully independently of one another upon each repetition.

5. The method as recited in claim 1, wherein the light distribution $I_A$ is reflected at the location of the sample using a mirror.

6. The method as recited in claim 1, wherein the method is simulated in the computer.

7. The method as recited in claim 1, wherein the repeating of steps a) to e) n-fold so as to generate the n-fold 3-tuple $(M_A, M_D; I_D)$ is varied upon each repetition so that the respective n-fold 3-tuples $(M_A, M_D; I_D)$ generated are different from each other.

8. A method for correcting a reflection image in microscopy, the method comprising:
radiating a light distribution $I_0$ using an illumination unit which is assigned to a microscope into an excitation path of the microscope, wherein the excitation path guides the light distribution $I_0$ to a sample and the light distribution $I_0$ is distorted upon entering the sample by scattering effects to form a light distribution $I_{A, sample}$;
reflecting the light distribution $I_{A, sample}$ at the sample in a detection path of the microscope, wherein the light distribution $I_{A, sample}$ is distorted upon exiting the sample to form a light distribution $I_{D, sample}$;
recording a reflected light distribution $I_{D, sample}$;
transferring the reflected light distribution $I_{D, sample}$ to a mathematical model F which describes a light propagation in reflection microscopy;
outputting a 2-tuple $(M_A, M_D)$, wherein $M_A$ describes a distortion of the light distribution $I_0$ upon entering the sample and $M_D$ describes a distortion of the light distribution $I_{A, sample}$ upon exiting the sample; and
setting at least one of a complementary distortion pattern $M_A^\#$ on an optical modulator of the excitation path and a complementary distortion pattern $M_D^\#$ on a further optical modulator of the detection path.

9. An irradiation apparatus for performing the method as recited in claim 8, the irradiation apparatus:
a microscope comprising,
an illumination unit which is configured to generate a light distribution $I_0$,
an excitation path having an optical modulator arranged therein, wherein the excitation path guides the light distribution $I_0$ to a location of a sample, and
a detection path comprising an optical modulator arranged therein, wherein the detection path passes on a reflected light at the location of the sample;
a camera configured to record the reflected light of the detection path; and
a computer assigned to the microscope.

10. The irradiation apparatus as recited in claim 9, wherein the illumination unit is a laser.

11. The irradiation apparatus as recited in claim 9, wherein the computer is configured to create a mathematical model F to describe a light propagation in reflection microscopy.

12. The irradiation apparatus as recited in claim 9, wherein,
the detection path further comprises a further optical modulator, and
the computer is configured to,
ascertain a 2-tuple correcting distortion pattern $(M_A^\#, M_D^\#)$,
to upload the correcting distortion pattern $M_A^\#$ to the optical modulator of the excitation path, and
to upload the correcting distortion pattern $M_D^\#$ to the further optical modulator of the detection path.

13. An irradiation apparatus for performing the method as recited in claim 1, the irradiation apparatus:
a microscope comprising,
an illumination unit which is configured to generate a light distribution $I_0$,
an excitation path having an optical modulator arranged therein, wherein the excitation path guides the light distribution $I_0$ to a location of a sample, and
a detection path comprising an optical modulator arranged therein, wherein the detection path passes on a reflected light at the location of the sample;
a camera configured to record the reflected light of the detection path; and
a computer assigned to the microscope.

14. The irradiation apparatus as recited in claim 13, wherein the illumination unit is a laser.

15. The irradiation apparatus as recited in claim 13, wherein the computer is configured to create a mathematical model F to describe a light propagation in reflection microscopy.

16. The irradiation apparatus as recited in claim 13, wherein,
the detection path further comprises a further optical modulator, and
the computer is configured to,
ascertain a 2-tuple correcting distortion pattern $(M_A^\#, M_D^\#)$,
to upload the correcting distortion pattern $M_A^\#$ to the optical modulator of the excitation path, and
to upload the correcting distortion pattern $M_D^\#$ to the further optical modulator of the detection path.

* * * * *